(No Model.)
L. C. ELLISON.
FERTILIZER DISTRIBUTER.
No. 586,019. Patented July 6, 1897.
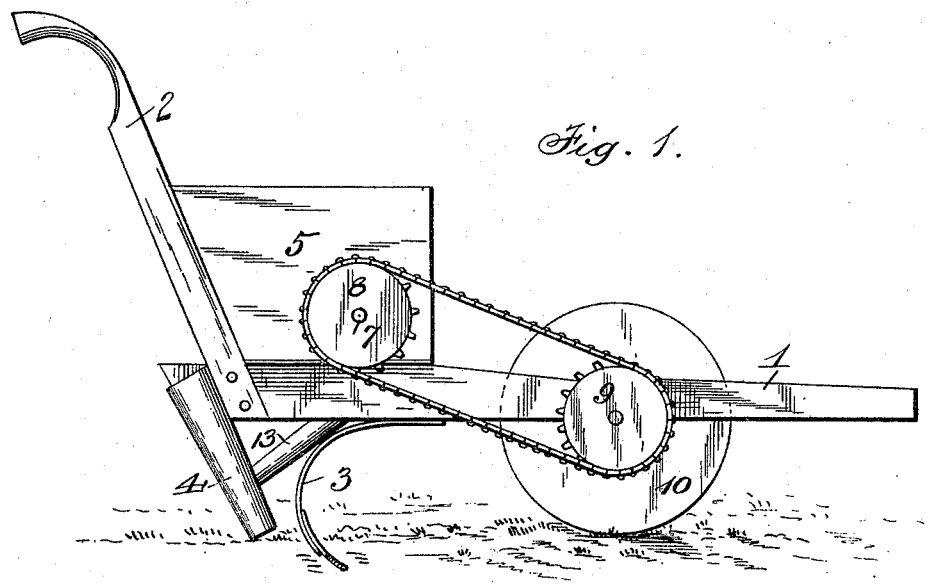
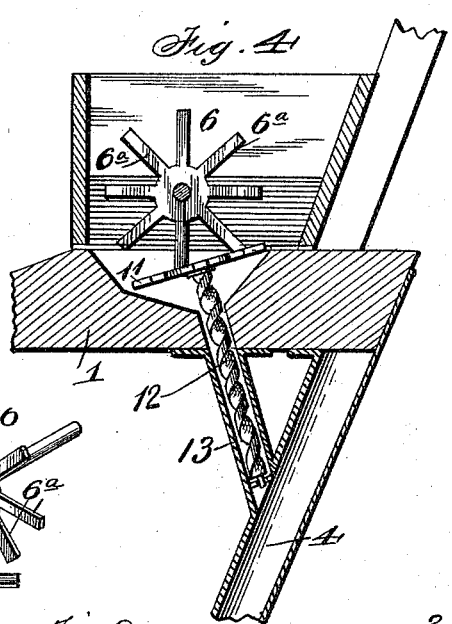
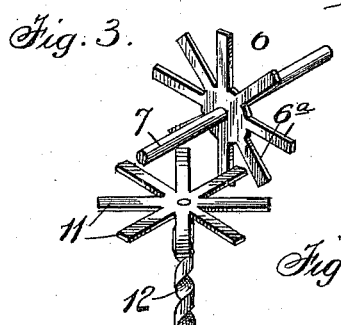
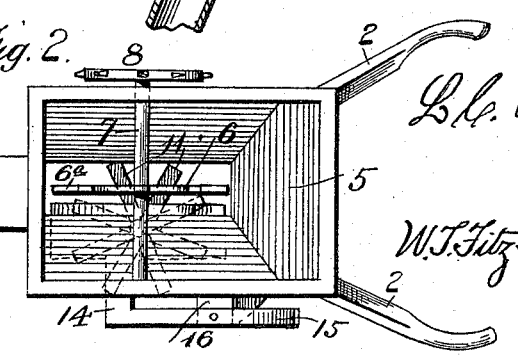
Witnesses
F. L. Ourand
M. I. Johnson
L. C. Ellison,
Inventor;
W. J. Fitzgerald & Co.,
Attorneys

UNITED STATES PATENT OFFICE.

LUTHER C. ELLISON, OF BUCK HILL, GEORGIA.

FERTILIZER-DISTRIBUTER.

SPECIFICATION forming part of Letters Patent No. 586,019, dated July 6, 1897.

Application filed July 3, 1896. Serial No. 598,013. (No model.)

*To all whom it may concern:*

Be it known that I, LUTHER C. ELLISON, a citizen of the United States, residing at Buck Hill, in the county of Fayette and State of Georgia, have invented certain new and useful Improvements in Fertilizer-Distributers; and I do hereby declare the following to be a full, clear, and exact description of the invention, such as will enable others skilled in the art to which it appertains to make and use the same.

My invention relates to new and useful improvements in fertilizer-distributers, which may be used to perform such function alone or may be easily combined with a grain-planting mechanism, performing both these functions in an effective manner.

In the following specification and the accompanying drawings I shall confine my description and illustration to the mechanism necessary for producing a fertilizer-distributer, and no particular reference will be made to the grain-planting attachment therefor.

Referring to the accompanying drawings, Figure 1 is a side elevation of my improved fertilizer-distributer. Fig. 2 is a top plan of Fig. 1. Fig. 3 is a perspective view of the feed-forcing mechanism mounted in its operative position. Fig. 4 is a sectional view of the force-feed mechanism.

For convenience of reference to the various parts of my invention figures will be employed, each figure referring to the same parts throughout the several views.

In carrying out my invention I first provide the beam 1, constructed substantially in the usual manner, which is provided on its rear end with the operating-handles 2. Extending downward from the lower end of said beam is provided the blade 3, which is adapted to take into the soil and make a furrow for receiving the grain or fertilizer to be deposited. Immediately in the rear of the blade 3 and extending downward from the rear end of the beam, to which it is secured, is the depositing-tube 4, which follows immediately behind the blade 3 and in practice deposits the fertilizer or grain in the bottom of the furrow, where it is covered by the falling earth from the sides of such furrow.

Upon the upper side and rear end of the beam I mount the hopper 5, in which is journaled in suitable bearings the revolving disk 6, mounted upon the shaft 7. Said shaft 7 extends outward through one side of the hopper and carries the operating sprocket-wheel 8, adapted to be driven by the chain from the sprocket-wheel 9, secured to the axle of the traction-wheel 10, as clearly set forth.

The feed-disk 6, above referred to, may be constructed in any preferred manner and is provided with the radial arms or fingers $6^a$, which latter are adapted to take through a slot in the bottom of the hopper and form engagement with the radial arms 11, secured to the feeding-screw 12. Said feeding-screw is mounted and adapted to revolve within the conveyer-tube 13, leading to the depositing-tube 4. By this arrangement I overcome the difficulty at present encountered when depositing fertilizing matter, as all clogging of the feed mechanism is absolutely prevented.

In order to regulate the quantity of fertilizer to be fed through the bottom of the hopper 5, I provide the sliding section 14, mounted in the bottom of the hopper in such a manner that it will have a lateral movement when the lever 15, attached thereto, is moved in or out. Said operating-lever 15 is mounted upon the outer side of the hopper and pivotally secured to the arm 16, enabling the free end of the lever to be moved inwardly or outwardly and cause the opening in the bottom of the hopper to be increased or diminished at will.

In operation the fertilizer to be distributed is placed within the hopper and the machine is then drawn over the ground in the usual manner, enabling it to form its own furrow, by means of the blade 3, and cause the revolution of the feeding-disk. The sliding section mounted in the bottom of the hopper is placed, by means of the operating-lever, in the desired position to secure the desired amount of fertilizer. The fingers $6^a$ of the feeding-disk reach entirely through the slot provided in the bottom of the hopper and engage with the radial arms 11 upon the feeding-screw 12, causing the latter to revolve, and the fertilizer will be forced through the conveyer-tube 13, where it will be directed by gravitation to the depositing-tube 4, and thence into the bottom of the furrow rearward of the blade 3.

It will be absolutely impossible to cause a choked condition of the feed mechanism by the use of the means I have described.

Believing that the advantages, operation, and construction of my improved fertilizer-distributer will be fully understood, further description is dispensed with.

Having thus described my invention, what I claim as new, and desire to secure by Letters Patent, is—

1. As an improvement in fertilizer-distributers, the combination with the hopper, of a feeding-disk provided with radial fingers mounted therein; a feeding-screw mounted beneath said hopper and provided upon its upper end with radial fingers adapted to engage the fingers on said disk and means, substantially as described, for driving said disk, as and for the purpose set forth.

2. As an improvement in fertilizer-distributers, the combination with the hopper and supporting-frame therefor, of a disk having radial fingers, rotatably mounted therein, said fingers taking through a slot provided in the bottom of said hopper; a conveyer and delivery tube located beneath said hopper, a feeding-screw rotatably mounted in the conveyer-tube and having radial fingers on its upper end designed to engage the fingers on the feeding-disk; a driving-sprocket attached to the shaft of said disk; a traction wheel and sprocket suitably mounted in the supporting-frame, and a sprocket-chain for operatively connecting said sprockets, all combined and arranged substantially in the manner and for the purpose set forth.

In testimony whereof I affix my signature in presence of two witnesses.

LUTHER C. ELLISON.

Witnesses:
 C. F. LANDRUM,
 I. I. HANDLEY.